3,650,992
METHOD FOR IMPREGNATING POLYMER BEADS WITH A BLOWING AGENT

Edward J. Schwoegler, Munster, Ind., assignor to Cupples Container Co., Austin, Tex.
No Drawing. Filed Sept. 15, 1970, Ser. No. 72,554
Int. Cl. C08j 1/26
U.S. Cl. 260—2.5 B       6 Claims

ABSTRACT OF THE DISCLOSURE

Particulate polymeric material, especially polystyrene, is impregnated with a blowing agent by suspending the particulate polymeric material in a suspension system comprising ethylene glycol and water, introducing a blowing agent, e.g., pentane, and maintaining under conditions of elevated temperature and pressure.

---

This invention relates to production of foamable thermoplastic polymeric material, and particularly to the introduction of a blowing agent into particulate polymeric materials, especially polystyrene beads.

The art of producing cellular (foamed) shapes from polystyrene and other thermoplastic polymeric materials by such techniques as closed mold-molding and extrusion has become highly developed and has achieved wide commercial acceptance. As a result, there is a great demand for raw materials which can be converted to foamed products. Early in the development of the art, most foamed products were prepared from polymeric particles, e.g., polystyrene beads, produced by suspension polymerization and containing a significant proportion of a blowing agent, such as pentane or other low-boiling hydrocarbons, such particulate foamable materials being used both for closed mold-molding and extrusion. As the demand for extruded foamed sheet increased, there was a trend toward use of foamable granules, produced by extrusion from powdered polymeric material with the blowing agent injected directly into the extruder, the extruded product being in the form of a rod or strand which was cooled and cut into granules. In view of the cost and relative complexity of employing an independent extruder to form the granules, which were usually then supplied to a sheet extrusion line, many converters adopted the practice of feeding powdered polymeric material to the sheet extruder, thus eliminating the cost of forming foamable particles by either the suspension polymerization procedure or the granule extruding technique. It was quickly discovered, however, that direct injection of the most useful blowing agents, i.e., the low boiling hydrocarbons such as pentane, into an extruder is unduly hazardous, the danger of fire and explosion being excessive. Faced with this situation, many extruders of foamed products from polystyrene and the like have retained the approach of directly injecting the blowing agent into the extruder, but have retreated to relatively non-flammable blowing agents, typically halocarbons such as the fluorochloromethanes, despite the fact that such non-inflammable blowing agents are, save for the reduction in fire hazard they afford, distinctly less desirable than are the low boiling hydrocarbons such as pentane.

Since foamable beads and like particles are preferred, if not essential, for many closed mold-molding operations, and since direct injection during extrusion has required compromise as to the quality of the blowing agent, there has been a continuing demand for and interest in foamable polymeric particles and particularly foamable polystyrene beads, and such materials are currently marketed in large quantities. Growth of this industry has been curtailed, however, by a number of factors, including relatively high cost of the foamable beads and relative difficulty in the production thereof. Such high cost and relative difficulty in production stem from a number of causes, but one important problem area has been in introduction of the blowing agent into the polymeric material. Though other procedures have been proposed, the usual practice is to impregnate the particles with the blowing agent under conditions of elevated temperature and pressure while maintaining the particles suspended in a liquid system made up of water, the blowing agent in liquid form, and minor proportions of a suspension aid, and this impregnating method has achieved wide acceptance. As practiced, however, the impregnation method is plagued by tendencies for the particles to become misshapen, to assume surface irregularities, and to agglomerate; for excessive foaming to occur; and for the blowing agent content of the particles to vary.

It is accordingly a general object of the invention to provide a method for introducing a blowing agent into thermoplastic polymeric particles in such fashion that the foregoing difficulties are, for practical purposes, overcome.

Broadly stated, the method comprises suspending the polymeric particles in a suspension medium comprising ethylene glycol and water, introducing into the suspension a normally liquid hydrocarbon blowing agent which boils below the softening temperature of the polymeric material, and subjecting the resulting liquid system to conditions of elevated temperature and pressure, while agitating the system to maintain the particles individually suspended, and while maintaining the pH of the system above 6. The method is effective in introducing dependably controlled amounts of the blowing agent into the particles, minimizing agglomeration and objectionable changes in shape and surface characteristics of the particles, and minimizing or eliminating the formation of foam during the process.

While the invention can be employed to introduce a blowing agent into any thermoplastic polymeric material which is suitable for the production of closed cell foams, it is most advantageous in the production of foamable particles of polystyrene, especially foamable polystyrene beads. In this connection, the term "polystyrene" is intended to include the usual styrene homopolymer; polymers of the styrene homologues such as alpha-methylstyrene; ortho-, meta-, and para-methylstyrene; the corresponding ethylstyrenes; blends of such polymers; and polystyrenes containing minor proportions of other, modifying polymers such, for example, as the ethylene-vinyl acetate copolymers. The invention is particularly useful in connection with polymeric thermoplastic materials which tend strongly to agglomerate under impregnation conditions.

The blowing agents useful in accordance with the invention are the normally liquid lower aliphatic hydrocarbons which boil in the range of 20–80° C. and which are essentially nonsolvents for the polymeric material, typically pentane, isopentane, cyclopentane, hexane, heptane, and petroleum ether.

In formulating the suspension medium, ethylene glycol is employed in a proportion to provide a weight ratio of ethylene glycol to water in the range of from about 6:1 to about 1:8, with proportions in the weight ratio range of 2:1–1:3 being particularly advantageous. To aid in suspending the polymeric particles, minor proportions of suspension aids are employed, including at least a finely divided inorganic suspension agent such as the difficultly soluble phosphates containing at least three equivalents of metal for each phosphate group, e.g., tricalcium phosphate, calcium carbonate, clays, talc, barium sulfate, or calcium sulfate, or combinations of such materials, the suspending agent being employed in an amount equal to 0.05-2% of the weight of the polymeric particles to be impregnated. Inorganic suspending agents are employed in finely divided form, with the average particle size ranging from below 1 micron to as large as 10 microns. For most inorganic suspending agents, an average particle size above 1 micron but not exceeding several microns will be satisfactory both from the standpoint of effectiveness and from the standpoint of economy. Additional suspension aids which function because of their colloidal nature, especially including polyvinyl alcohol in an amount equal to 0.05-0.5% of the polymer weight, can also be employed.

The weight ratio of the suspension medium, i.e., ethylene glycol, water and suspension aids, to the polymeric particles is advantageously in the range of from 5:4 to 1:2, use of a quantity of suspension medium about equal to the weight of the polymeric particles being typical.

The pH of the liquid system is maintained above 6 throughout the impregnation and this is accomplished by addition of a basic inorganic compound. The basic compound can be added to the suspension medium initially, before the blowing agent is introduced, or subsequently as the impregnation procedure progresses. According to one embodiment, calcium carbonate can be added to the suspension medium initially and will serve both as the inorganic suspending agent and as the pH control additive. In such cases, the calcium carbonate is employed in a total amount equal to 0.5-6% of the weight of the polymeric particles. In other embodiments, the pH is maintained above 6 by adding at least one basic inorganic compound selected from the group consisting of the hydroxides of calcium, sodium, potassium, lithium and magnesium and the oxides of magnesium and barium, the total weight of the pH control additive being in the range of 0.001-0.1% of the weight of the polymeric particles being impregnated. It is practical and convenient to employ calcium hydroxide in an amount typically equal to 0.005% of the weight of the polystyrene beads when impregnating polystyrene beads produced by suspension polymerization.

The method can be carried out in any sealed vessel equipped with an effective agitator and means for maintaining conditions of elevated temperature and pressure. In commercial production when dealing with polystyrene beads formed by suspension polymerization, it is convenient to carry out the method in the same type of reaction vessel employed for polymerization, typically a glass-lined reactor equipped with a rotary agitator, a steam jacket, and a sealed closure.

Once the initial suspension has been prepared, the vessel is purged with nitrogen, the blowing agent then run in and, with the vessel sealed and with continuous agitation, the liquid system formed by the suspension medium and the blowing agent (with the polymer particles suspended therein) is maintained at a temperature in the range of 75-160° F. for a period of 2-10 hours under a pressure of 50-300 p.s.i. At the end of this impregnation period, the system is cooled, the vessel vented, and the impregnated polymeric particles are recovered, as by decanting or by discharging the contents of the vessel onto a screen. The recovered beads are washed with water and dried conventionally. When the polymer particles are polystyrene beads produced by suspension polymerization, blowing agent contents on the order of 6-10% by weight can readily and dependably be achieved with impregnation times on the order of 5-6 hours with temperatures of 130-150° F. and pressures of 140-200 p.s.i. and with the blowing agent content of the liquid system amounting to, e.g., 15% of the polystyrene weight when the blowing agent is normal pentane.

The method has the advantages of obtaining higher impregnation rates, with the level of impregnation being predeterminable with reasonable accuracy, while minimizing or eliminating foam, agglomeration of the particles, distortion of the particles, and deleterious changes in surface characteristics. Though the reasons for the advantages are not fully understood, it appears that the ethylene glycol acts at least both as a suspension aid and to inhibit foam.

The following examples are illustrative:

EXAMPLE 1

Using the same 1 gallon vessel equipped with a rotary agitator, a heater, and a sealed closure, two impregnation runs were made with the same polystyrene beads, the suspension medium of one run (hereafter "Run A") being water and the suspension medium of the other run (hereafter "Run B") comprising both water and ethylene glycol. Formulations for the two suspension media were as follows:

RUN A

| Ingredient: | Weight in grams |
|---|---|
| Water, deionized | 750 |
| Tricalcium phosphate | 7.5 |
| Polyvinyl alcohol | 1.5 |
| Calcium hydroxide | .03 |

RUN B

| Ingredient: | Weight in grams |
|---|---|
| Water, deionized | 600 |
| Ethylene glycol | 150 |
| Tricalcium phosphate | 7.5 |
| Polyvinyl alcohol | 1.5 |
| Calcium hydroxide | .03 |

In both runs, 750 grams of polystyrene beads were employed, the beads being from the same suspension polymerization run and having a viscosity average molecular weight of 135,000, there being no differences between the two 750-gram lots of beads. Normal pentane from the same lot was employed in both Runs A and B.

Both runs were carried out by dissolving the polyvinyl alcohol in 300 grams of the water, dispersing the tricalcium phosphate and calcium hydroxide in that solution, then introducing the solution into the vessel and adding the remaining water and the polystyrene beads. The vessel was then purged with nitrogen, 112.2 grams of pentane was run in to combine with the suspension to form the complete liquid system, the vessel was pressured up to 110 p.s.i. with nitrogen, and then maintained at 140° F. and a pressure of approximately 150 p.s.i. for 5 hours. The agitator speed was held at 450 r.p.m. for both runs. At the end of the 5-hour period, heating was stopped, the vessel cooled and vented, and the polystyrene beads recovered from the liquid system. The pH for Run A was 7.25, and the pH for Run B was 7.45.

A significant amount of foaming was observed in Run A, while Run B exhibited no foaming. The beads recovered from Run A were found to have a volatile content (substantially all pentane) of 7.53% by weight. The volatile content for the beads from Run A was 9.36% by weight. Examined under the microscope, the beads from Run A were clear, transparent and spherical, but exhibited some inclusions, some occlusions, and surface blemishes in the form of pock marks. Similarly examined, the beads from Run B were found to be clear, transparent and spherical, with no inclusions, occlusions or surface blemishes.

EXAMPLE 2

Using the same apparatus and procedure as in Example 1, a suspension medium was prepared according to the following formulation:

| Ingredient: | Weight in grams |
|---|---|
| Water, deionized | 325 |
| Ethylene glycol | 425 |
| Tricalcium phosphate | 5.6 |
| Polyvinyl alcohol | .75 |
| Calcium hydroxide | .03 |

750 grams of polystyrene beads prepared by suspension polymerization and having a viscosity average molecular weight of 132,500 was suspended in the water-ethylene glycol medium. The blowing agent was normal pentane, the amount employed being 150 grams. The liquid system containing the beads and agitated continuously at 450 r.p.m. was held at about 140° F. and 150 p.s.i. pressure for 6½ hours. Volatile content of the recovered impregnated beads was 10.4% by weight. The system was foam free. By microscopic examination, the impregnated beads were found to be substantially sperical and smooth, with only a negligible amount of change in bead shape.

EXAMPLE 3

Polystyrene beads containing 2% by weight of an ethylene-vinyl acetate copolymer having an average molecular weight in the range of 20,000–30,000 and an ethylene-to-vinyl acetate weight ratio of about 2:1 are prepared by dissolving the copolymer in liquid styrene monomer at 52° C. with agitation, dispersing the resulting solution in an aqueous suspension medium, and carrying out suspension polymerization to yield beads of copolymer-modified polystyrene having a viscosity average molecular weight of 142,500. 750 grams of the resulting beads are impregnated with normal pentane by suspending them in a suspension medium consisting of 600 grams of deionized water, 150 grams of ethylene glycol, 3 grams of tricalcium phosphate, 1.5 grams of polyvinyl alcohol, and 0.075 gram of calcium hydroxide. Pentane in the amount of 112.5 grams is then run in, and the bead-containing liquid system is maintained for 4 hours at 140° F. and a pressure of 100–110 p.s.i., with continual agitation at 450 r.p.m. The pH of the system is about 7.5. The recovered beads have a volatile content of approximately 6%, and are spherical and, due to the copolymer content, opalescent to opaque in appearance.

What is claimed is:
1. The method for impregnating polystyrene particles with a blowing agent, comprising
   suspending the polystyrene particles in a liquid suspension medium comprising ethylene glycol, water and a finely divided inorganic suspending agent,
       the weight ratio of ethylene glycol to water being in the range of from about 6:1 to about 1:8;
   introducing into the suspension medium a normally liquid hydrocarbon blowing agent which boils below 90° C. and is effectively a non-solvent for the polystyrene while maintaining the suspension medium in a sealed vessel;
   maintaining the resulting liquid system at a temperature of 75–160° F. for a period of 2–10 hours under a pressure of 50–300 p.s.i. while maintaining the pH of the system above 6 and continuously agitating the same; and
   recovering the blowing agent-impregnated beads from the liquid suspension medium.
2. The method defined in claim 1, wherein
   the weight ratio of said suspension medium to the polystyrene particles is in the range of from 5:4 to 1:2.
3. The method defined in claim 2, wherein
   the step of maintaining the pH of the liquid system above 6 is carried out by incorporating in the suspension an amount of a basic inorganic compound selected from the group consisting of the hydroxides of calcium, sodium, potassium, lithium and magnesium and the oxides of magnesium and barium, said basic inorganic compound being employed in an amount equal to 0.001–0.1% of the weight of the polystyrene particles.
4. The method defined in claim 1, wherein
   said finely devided inorganic suspending agent is calcium carbonate,
   the step of maintaining the pH of the liquid system above 6 is carried out by incorporating calcium carbonate in the suspension, and
   the total amount of calcium carbonate employed in the suspension is in the range of 0.5–6% of the weight of the polystyrene particles.
5. The method defined in claim 2, wherein
   the polystyrene particles are beads, and
   the blowing agent is selected from the group consisting of pentane, isopentane and petroleum ether.
6. The method defined in claim 1, wherein
   the weight ratio of ethylene glycol to water is in the range of from about 2:1 to about 1:3.

References Cited
UNITED STATES PATENTS 2,744,291   5/1956   Stastny et al. _____ 260—2.5 B
2,857,339   10/1958   Colwell et al. ___ __260—2.5 B MURRAY TILLMAN, Primary Examiner M. FOELAK, Assistant Examiner U.S. Cl. X.R.

260—29.6 ME, 33.4 R